(12) United States Patent
Snediker et al.

(10) Patent No.: US 11,089,894 B2
(45) Date of Patent: Aug. 17, 2021

(54) DRY FOOD DISPENSING APPARATUS

(71) Applicant: Chicago Show, Inc., Buffalo Grove, IL (US)

(72) Inventors: Robert R. Snediker, Northfield, IL (US); Raymond J. Gradecki, Mundelein, IL (US)

(73) Assignee: Chicago Show, Inc., Buffalo Grove, IL (US)

( * ) Notice: Subject to any disclaimer, the term of this patent is extended or adjusted under 35 U.S.C. 154(b) by 0 days.

(21) Appl. No.: 16/746,163

(22) Filed: Jan. 17, 2020

(65) Prior Publication Data

US 2020/0275791 A1 Sep. 3, 2020

Related U.S. Application Data

(60) Provisional application No. 62/794,095, filed on Jan. 18, 2019.

(51) Int. Cl.
| | |
|---|---|
| *A47G 19/34* | (2006.01) |
| *B65D 83/00* | (2006.01) |
| *B65D 83/06* | (2006.01) |
| *G01F 11/24* | (2006.01) |

(52) U.S. Cl.
CPC ......... *A47G 19/34* (2013.01); *B65D 83/0083* (2013.01); *B65D 83/06* (2013.01); *G01F 11/24* (2013.01)

(58) Field of Classification Search
CPC .... A47G 19/34; B65D 83/0083; B65D 83/06; G01F 11/24

USPC ......................................................... 222/368
See application file for complete search history.

(56) References Cited

U.S. PATENT DOCUMENTS

| | | | | |
|---|---|---|---|---|
| 533,255 | A * | 1/1895 | Merrill | G01F 11/24 73/218 |
| 1,022,774 | A * | 4/1912 | De Julio | G01F 11/24 222/368 |
| 2,122,695 | A * | 7/1938 | Podwyszynski | A47K 5/10 222/368 |
| 2,315,244 | A * | 3/1943 | Campbell, Jr. | B65D 83/06 222/303 |
| 2,518,520 | A * | 8/1950 | Broun | G01F 11/24 222/368 |

(Continued)

*Primary Examiner* — Benjamin R Shaw
(74) *Attorney, Agent, or Firm* — Barnes & Thornburg LLP; Robert E. Browne

(57) ABSTRACT

The present invention provides a new bulk, dry foods dispensing apparatus and system for commercial, retail and home use designed to dispense a predetermined volume of dry bulk food into a bowl or other receptacle without crushing or breaking the food. The bulk food dispenser includes a hopper, a dispensing chamber including two or more openings, a baffle located above the dispensing chamber for directing the solid bulk material to be dispensed from the hopper to the dispensing chamber, and a paddle wheel located within the dispensing chamber, where the paddle wheel further includes a plurality of protrusions for directing a solid material out of the dispensing chamber when the paddle wheel is rotated, where at least one of the two or more openings receive the solid material directed by the baffle, and where at least one of the two or more openings dispense the solid material out of the dispensing chamber.

6 Claims, 27 Drawing Sheets

(56) References Cited

U.S. PATENT DOCUMENTS

| | | | | |
|---|---|---|---|---|
| 2,575,967 | A * | 11/1951 | Cecil | A47K 5/10 222/39 |
| 2,920,796 | A * | 1/1960 | Field | A47G 19/34 222/185.1 |
| 3,131,821 | A * | 5/1964 | Tsujihata | C21B 7/18 414/201 |
| 3,367,544 | A * | 2/1968 | Formando | B65G 53/4633 222/368 |
| 3,754,686 | A * | 8/1973 | Karlen | G01F 11/24 222/238 |
| 3,970,224 | A * | 7/1976 | Chatham | E21D 9/12 222/370 |
| 4,268,205 | A * | 5/1981 | Vacca | B65G 53/4633 222/368 |
| 4,427,136 | A * | 1/1984 | MacKay | G01F 11/24 222/368 |
| 4,508,473 | A * | 4/1985 | Richter | G01F 11/24 406/64 |
| 4,511,067 | A * | 4/1985 | Martin | G01F 11/24 222/230 |
| 4,569,463 | A * | 2/1986 | Pellegrino | A47G 19/34 222/185.1 |
| 4,823,993 | A * | 4/1989 | Siegel | B65G 53/4633 222/345 |
| RE33,083 | E * | 10/1989 | Pellegrino | A47G 19/34 222/288 |
| 4,957,219 | A * | 9/1990 | Robbins | A47G 19/34 222/368 |
| 5,109,893 | A * | 5/1992 | Derby | B65B 1/26 141/10 |
| 5,114,053 | A * | 5/1992 | Beirle | B65G 53/4633 222/345 |
| 5,253,535 | A * | 10/1993 | McCown | B65G 53/4633 250/356.1 |
| 5,303,672 | A * | 4/1994 | Morris | A01K 61/80 119/51.11 |
| 6,237,816 | B1 * | 5/2001 | Boritzki | B65G 53/4633 222/1 |
| 6,779,691 | B2 * | 8/2004 | Cheng | B65G 53/4633 222/368 |
| 7,461,763 | B1 * | 12/2008 | Winn | A47F 1/03 222/158 |
| 2003/0234264 | A1 * | 12/2003 | Landau | A47G 19/34 222/368 |
| 2006/0027609 | A1 * | 2/2006 | Landau | B65G 65/4881 222/434 |
| 2007/0138211 | A1 * | 6/2007 | O'Leary | B65G 53/4633 222/368 |
| 2010/0320236 | A1 * | 12/2010 | Hassan | A47G 19/34 222/368 |

* cited by examiner

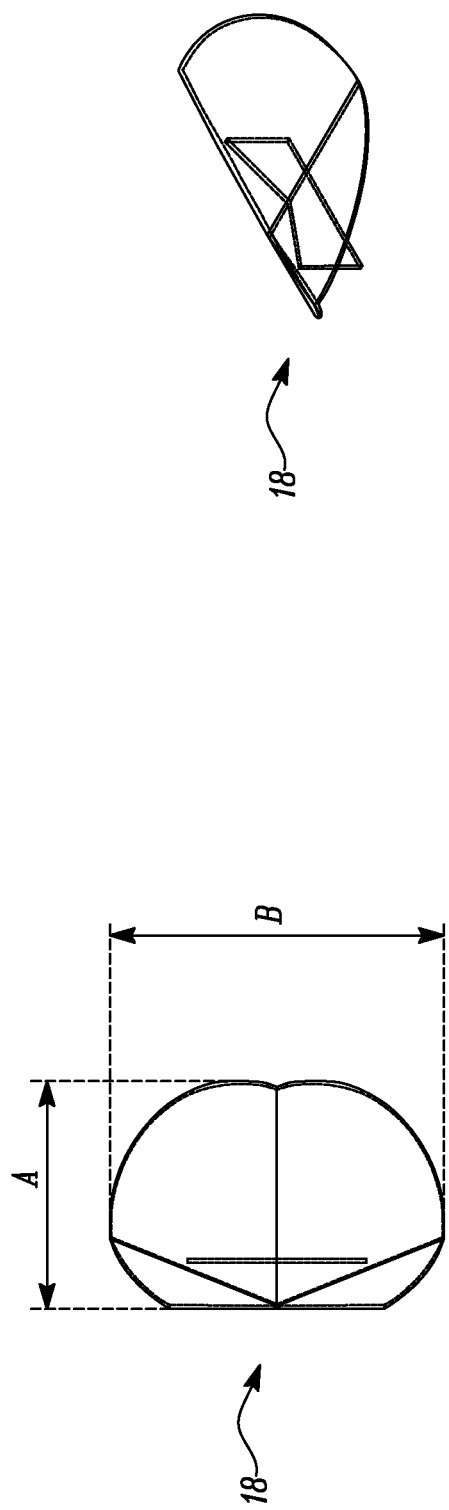
FIG. 7B
FIG. 7D
FIG. 7A
FIG. 7C

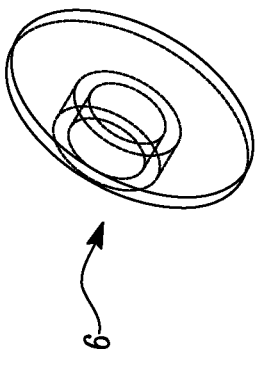
FIG. 14B
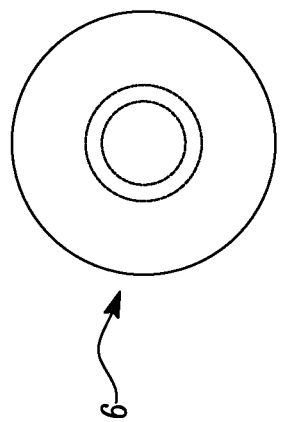
FIG. 14D
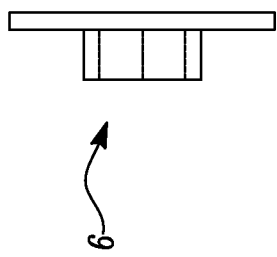
FIG. 14A
FIG. 14C

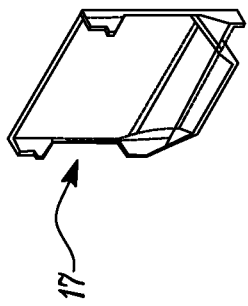
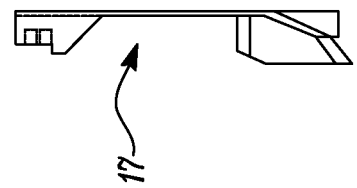
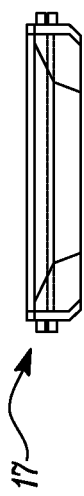
FIG. 18A  FIG. 18B  FIG. 18C  FIG. 18D

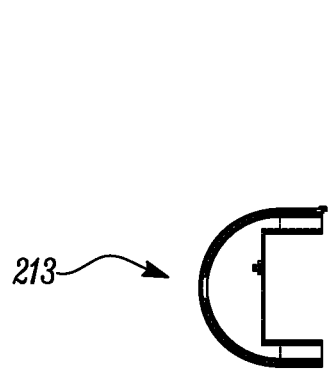
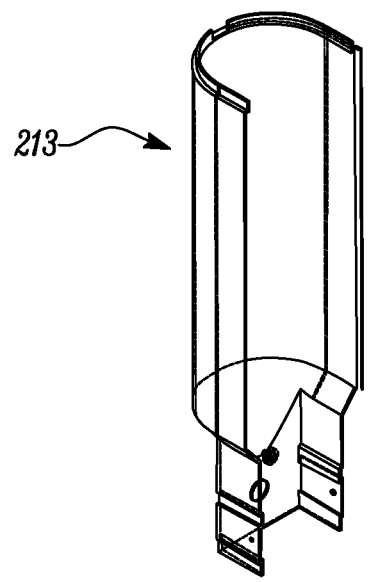
FIG. 24A    FIG. 24B
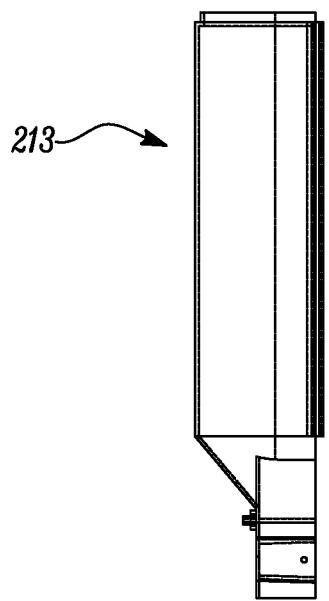
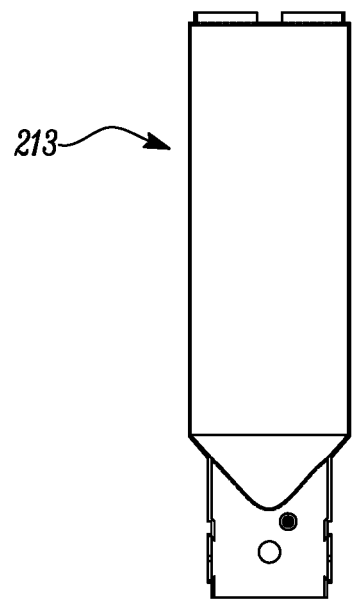
FIG. 24C    FIG. 24D

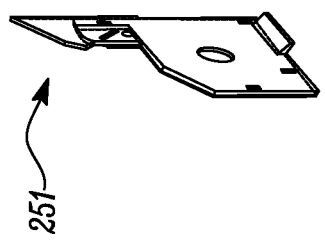
FIG. 26B
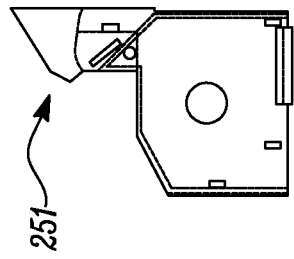
FIG. 26D
FIG. 26A
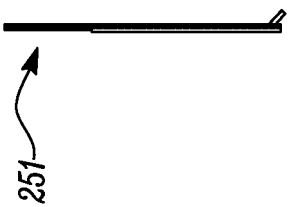
FIG. 26C

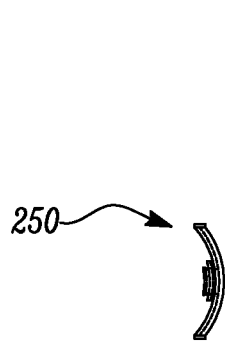
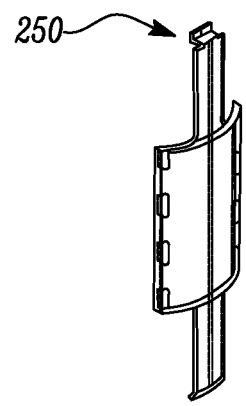
FIG. 27A  FIG. 27B
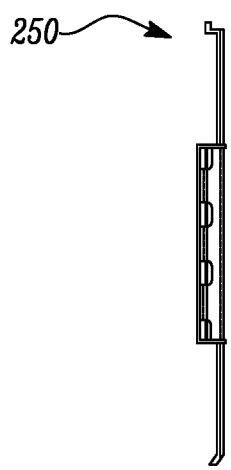
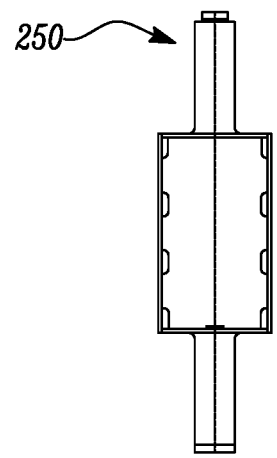
FIG. 27C  FIG. 27D

DRY FOOD DISPENSING APPARATUS

BACKGROUND

The present invention generally relates to bulk dispensers for comestibles, particularly to bulk dispensers for ready-to-eat cereals, and specifically to bulk dispensers for comestibles which minimize the generation of product fines due to product breakage and rough handling.

Conventionally, ready-to-eat cereal is often dispensed in bulk form at dormitories, hotels, and other commercial institutions from slide type dispensers. However, such dispensers dispense only one volume amount that could be too little or too much for the particular person. Other alternative designs that continuously dispense dry foods dispense the food too fast and therefore create waste.

Alternatively, using a scoop to dispense dry foods is also undesirable as it increases the risk of contaminating the dry food remaining inside the storage container.

Improved dispensing methods such as auger dispensing systems disclosed in the U.S. Pat. Nos. 7,461,763 and 5,826,754 use a pivotal auger mechanism to dispense the dry food from the internal storage. However, these auger systems tend to crush more delicate dry foods, such as flakes type cereal.

BRIEF DESCRIPTION OF THE DRAWINGS

FIGS. 7A through 7D show different views of the baffle of the preferred embodiment of the present invention.

FIGS. 14A through 14D show different views of the handle cap of the preferred embodiment of the present invention.

FIGS. 18A through 18D show different views of the back plate of the paddle housing assembly of the preferred embodiment of the present invention.

FIGS. 24A through 24D show different views of one of the hopper halves of the alternative embodiment of the present invention.

FIGS. 26A through 26D show different views of the first side plate of the paddle housing assembly of the alternative embodiment of the present invention.

FIGS. 27A through 27D show different views of the graphic holder of the alternative embodiment of the present invention.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

The present invention provides a new bulk, dry foods dispensing system for commercial, retail, and home use. This unique new invention differs in several ways from the prior art. In particular, it is more compact in size in the dispensing area and therefore reduces the amount of space required on the counter. Further, it uses a unique and specifically positioned and dimensioned set of interior baffles, paddles and ridges that enable a smooth, controlled flow of material from the storage hopper through the dispensing chamber and eliminate bridging of the product.

The specific positioning and alignment of the baffles in relation to the rotating wheel in the dispensing chamber, combined with the specific design, shape, length and circumference of the rotating cylinder allow product portions to be dispensed without breaking of irregularly shaped food product and without jamming within the mechanism. The chamber cylinder manages the product in a specific manner to prevent jamming while agitating the product and promoting a continuous flow without breaking or damaging it. As the cylinder rotates within its chamber, housing it dispenses an appropriate, amount of product, normally approximately one-half cup by volume depending on the type of cereal, while preventing the free flow of product out of the housing.

All elements of this design have been engineered and fit together to make this dispensing system unique. The size and/or position of the flow assists 10 and 11, the paddle wheel 20, dispensing assembly, and baffle 18 have been optimized to cause the system to work efficiently without jamming or bridging product.

Figure 1:
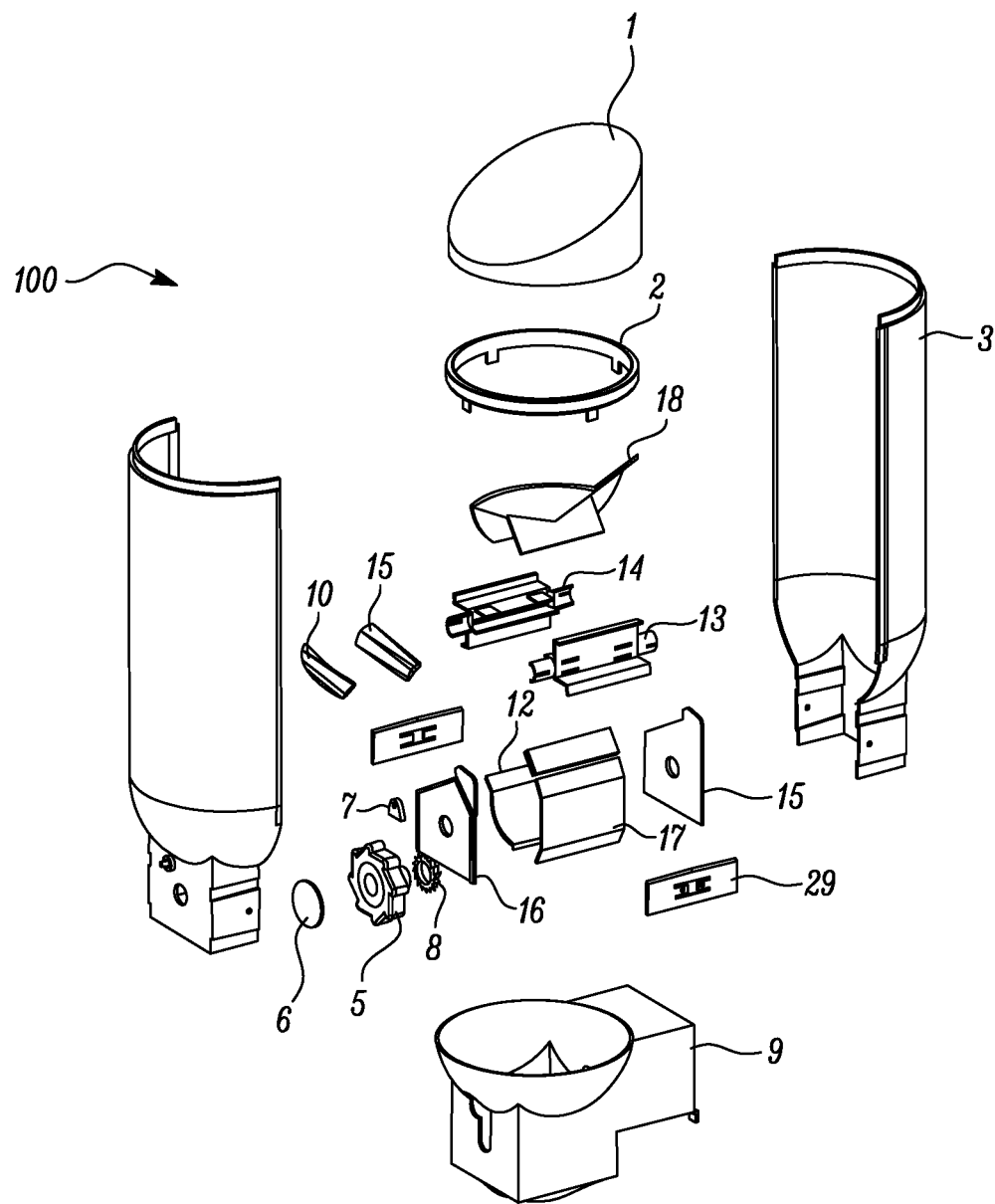
FIG. 1 show an exploded view of the preferred embodiment of the dry food dispenser.

FIG. 1 shows an exploded view of the preferred embodiment of the dry food dispenser 100. The bulk dry food dispenser includes a cap 1, a retainer ring 2, two hopper halves 3 and 4, which may be joined to form an upper storage portion to hold dry cereal, a lower dispensing chamber 30 to dispense cereal from the storage portion, a handle 5, a handle cap 6, an escape cog 7, an escape wheel 8, a base 9, and two flow assists 10 and 11. The dispensing chamber assembly 30, which is discussed further in relation to FIG. 3 includes a front sweep 12, a paddle wheel 20 comprised of two paddle halves 13 and 14 which may be joined to form the paddle wheel 20, two side paddle housing plates 15 and 16, a back housing plate 17, and a baffle 18.

In operation, the two halves 3 and 4 of the dispenser are mechanically connected to one another and secured by the retainer ring 2 to form an upper storage portion or hopper to retain bulk solid material to be dispensed. Once the hopper is filled with a material, such as corn flakes, a baffle 18, which is located in the lower part of the dispensing chamber assembly 30 portion of the halves 3-4 directs the material housed therein by gravity towards the paddle wheel 20 in the dispensing chamber assembly 30. The paddle wheel 20 is enclosed within two side paddle housing plates 15-16, the front sweep 12, and the back housing plate 17. The front sweep 12 and the back plate 17 are located at the lower portion of the housing assembly to direct the flow of the material swept with the paddle wheel 20 to the opening in the base 9.

The handle 5 is operatively connected to the escape wheel 8 through a plurality of gears having intersecting teeth located in the outer diameter of the escape wheel 8. The escape wheel 8 is further operatively connected to the paddle wheel 20, shown as two paddle wheel halves 13-14. When a user rotates the handle 5, the engagement of the escape wheel 8 with the paddle wheel 20 causes the paddle wheel 20 to rotate proportional to the rotation of the handle 5. When the hopper halves are connected together to form the hopper and it is filled with solid material, the solid material is directed to the paddle wheel 20, which carries the solid material through and dispenses it through the opening into the base 9, which is further dispensed out of an opening on the front side of the base 9.

Figure 5B:
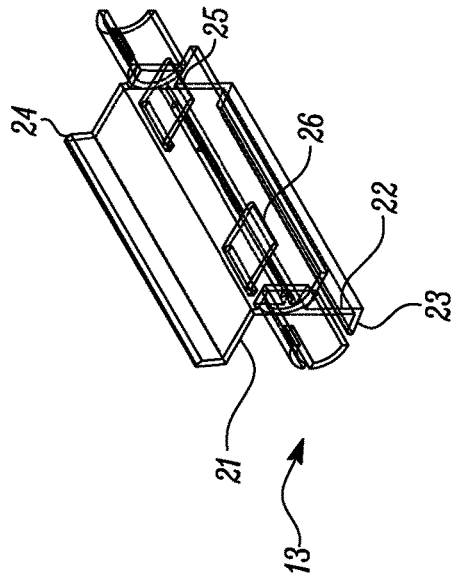
FIGS. 5A through 5D show different views of one-half of the paddle wheel of the preferred embodiment of the present invention.
Figure 5A:
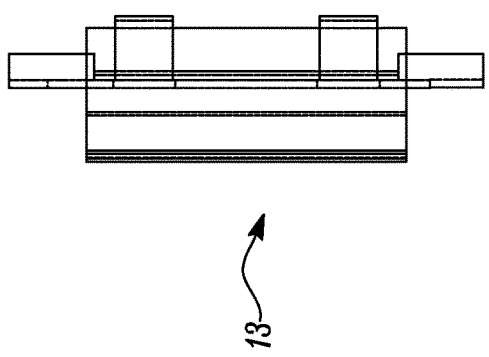

As seen in FIG. 5B, each half of the paddle wheel 20 contains two sweeping protrusions 21-22, two blocking sections 23-24 at one end of the sweeping protrusions 21-22, and two connecting protrusions 25-26. The sweeping protrusions 21-22 with the aid of the blocking sections 23-24 limit the amount of the solid material to be carried through and dispensed. The shape and dimensions of the sweeping protrusions 21-22 are in proportion to the front sweep 12 and the housing plates 15-16 and limit the amount of food to be dispensed at each rotation of the paddle wheel 20.

As a user rotates the paddle wheel 20, the solid material fills the next opening created by the sweeping motion of the sweeping protrusions 21-22. The next protrusion in the circumference of the paddle wheel collects a specific volume of the solid material, and generally prevents the solid material from being dispensed uncontrollably.

Figure 2:
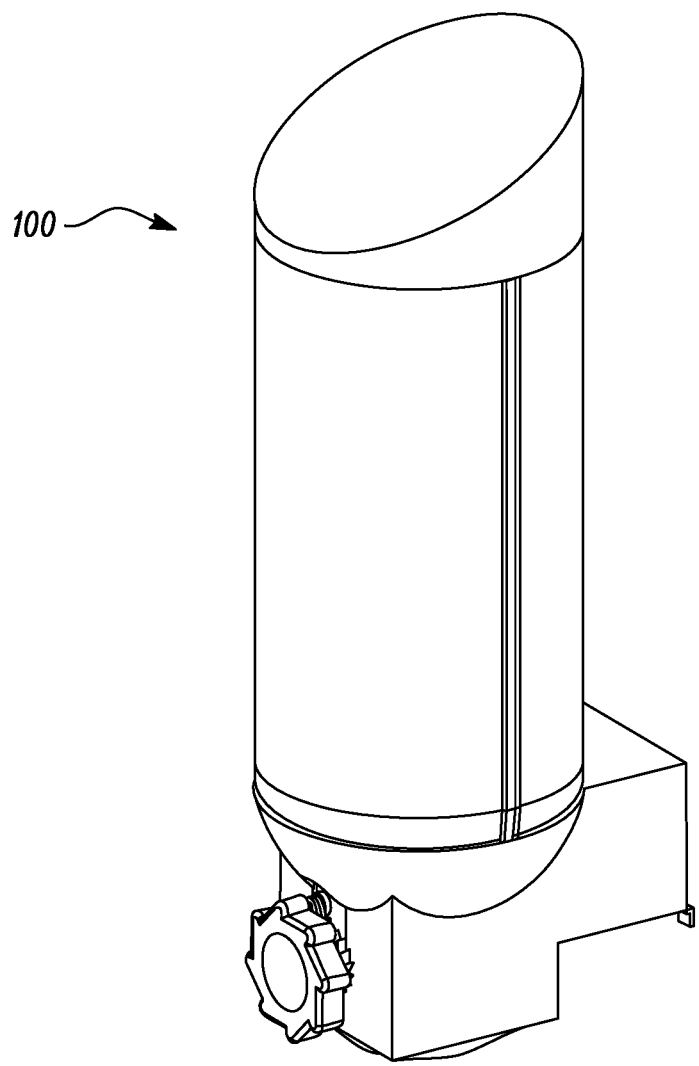
FIG. 2 shows the preferred embodiment of the bulk dry dispenser in its assembled form.

FIG. 2 shows the preferred embodiment of the dry food dispenser 100 in its assembled form.

Figure 3:
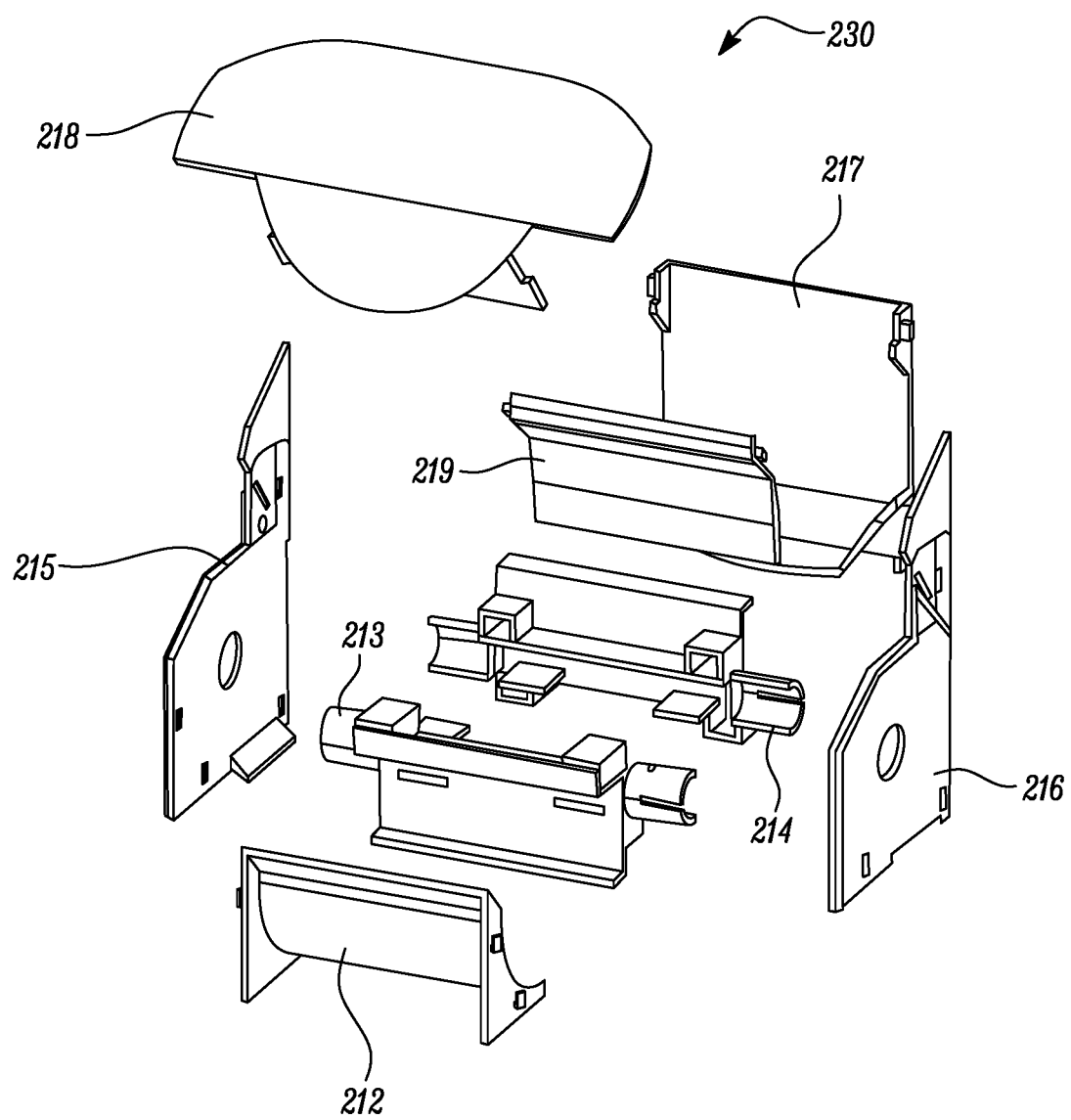
FIG. 3 shows an exploded view of the housing assembly of the preferred embodiment of the present invention without the paddle wheel.

FIG. 3 shows the exploded view of the dispensing chamber assembly 30 of the preferred embodiment of the present invention without the paddle wheel 20. When connected, the baffle 18 directs the solid food towards the front sweep 12, while the side plate 15-16 and the back plate 17 retain the solid material within the dispensing chamber assembly 30 during the operation of the paddle wheel 20. The bottom section of the front sweep 12 and the back plate 17 create an opening to dispense the solid material.

Figure 4:
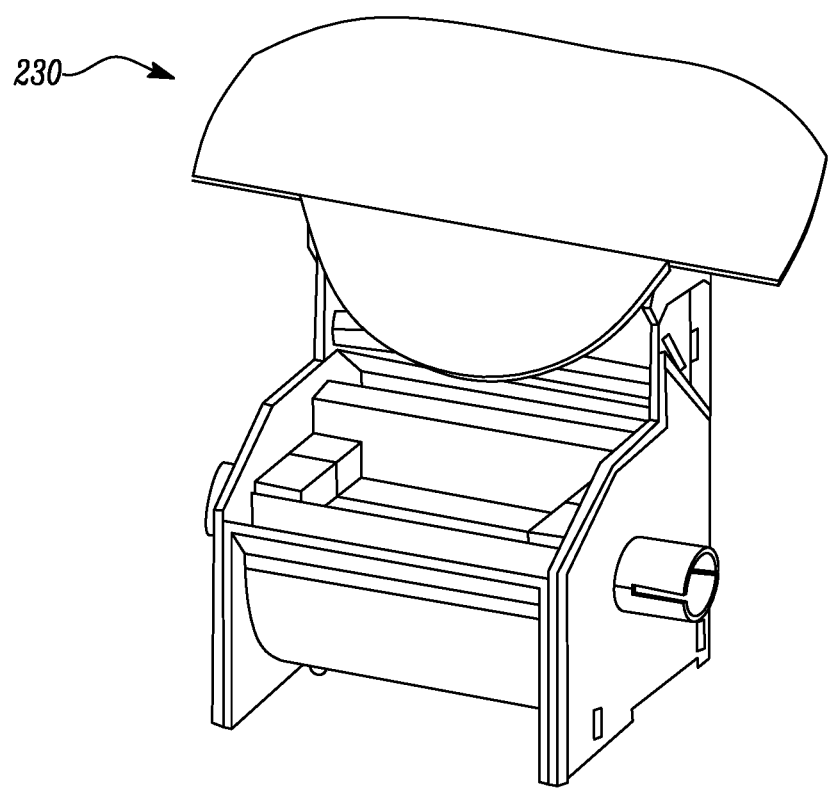
FIG. 4 shows the housing assembly of the preferred embodiment of the present invention when it is assembled.

FIG. 4 shows the housing assembly of the preferred embodiment of the present invention when it is assembled.

The specific parts of the preferred embodiment of the bulk dispenser is explained below in further detail below. Although certain preferred dimensional ranges are provided here, it should be understood that the dimensions may be modified to some extent without deviating from the spirit of the invention. However, it has been discovered that the preferred dimensional ranges for elements in the dispensing chamber are synergistic and optimal.

Figure 5D:
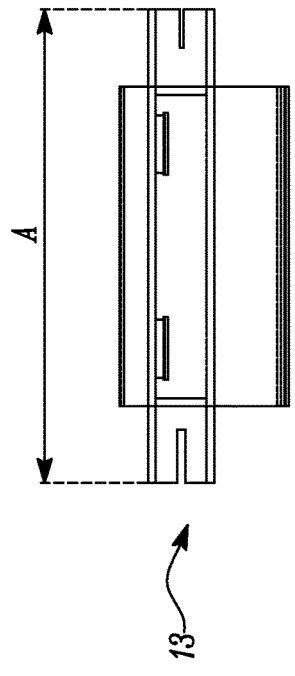
Figure 5C:
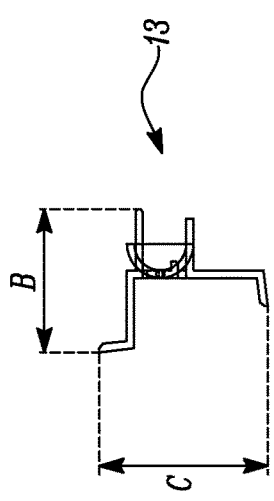

FIG. 5A-5D show one paddle wheel half 13 of the preferred embodiment of the present invention. As seen in FIG. 5D, in the preferred embodiment, the paddle wheel has a length A of 6-7". As further seen in FIG. 5C, the paddle wheel half 13 has a distance B of 1.6-2" and a distance C of 2.1-2.3". The other paddle wheel half 14 is identical to the paddle wheel half 13 as shown in FIGS. 5A-D. Two paddle wheel halves are connected through the connecting protrusions 25-26.

Figure 6B:
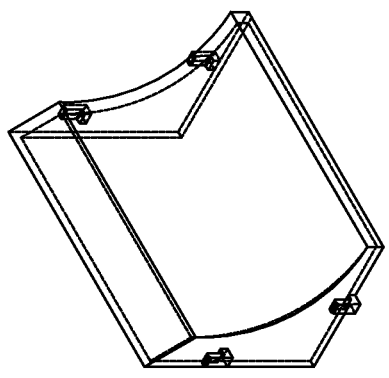
FIGS. 6A through 6D show different views of the front sweep of the preferred embodiment of the present invention.
Figure 6D:
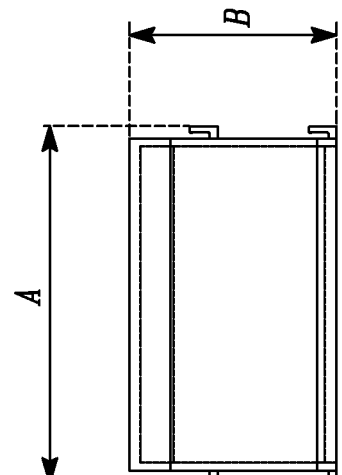
Figure 6A:
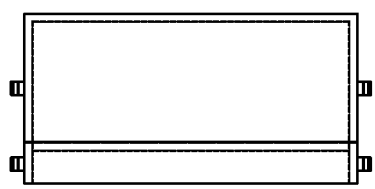
Figure 6C:
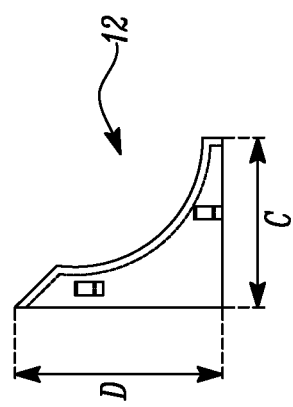
Figure 8B:
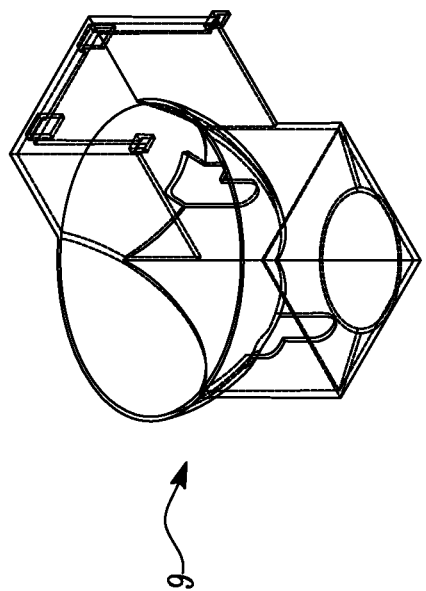
FIGS. 8A through 8D show different views of the base of the preferred embodiment of the present invention.
Figure 8A:
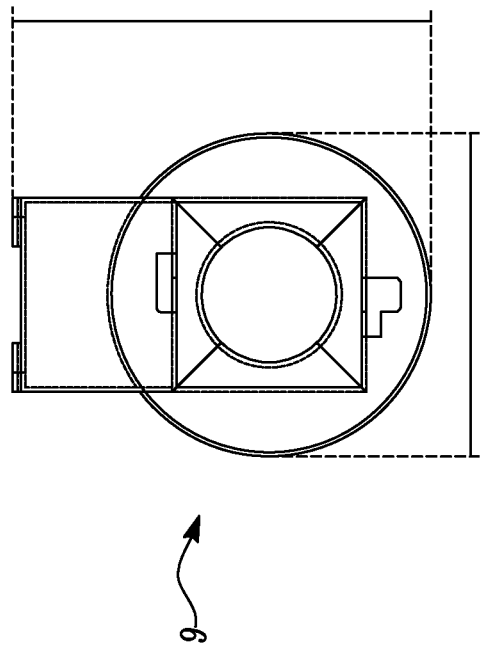
Figure 8D:
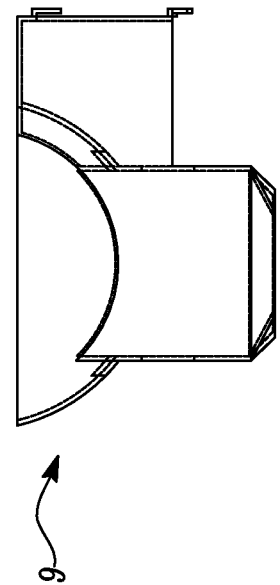
Figure 8C:
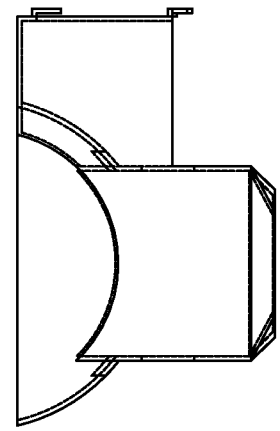
Figure 9B:
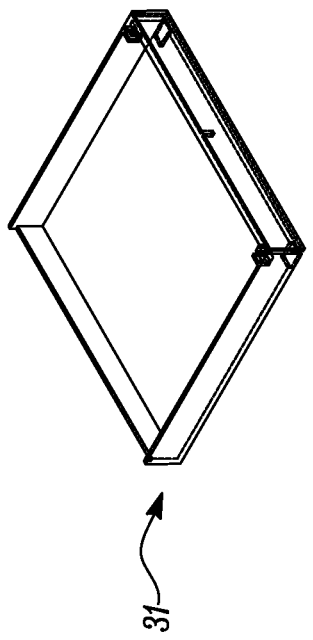
FIGS. 9A through 9D show different views of the crumb tray of the preferred embodiment of the present invention.
Figure 9D:
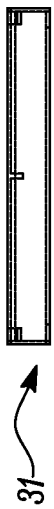
Figure 9A:
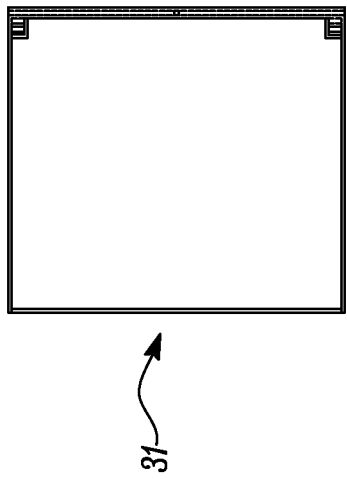
Figure 9C:
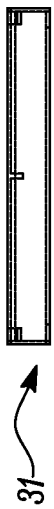
Figure 10B:
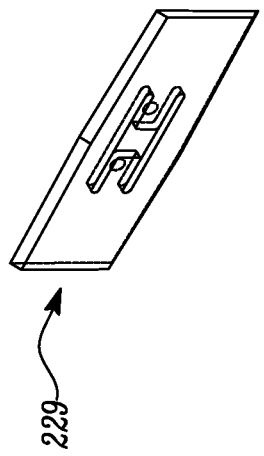
FIGS. 10A through 10D show different views of the bottom clip of the preferred embodiment of the present invention.
Figure 10D:
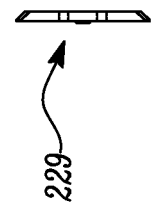
Figure 10A:
Figure 10C:
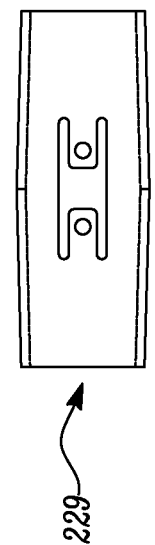
Figure 11B:
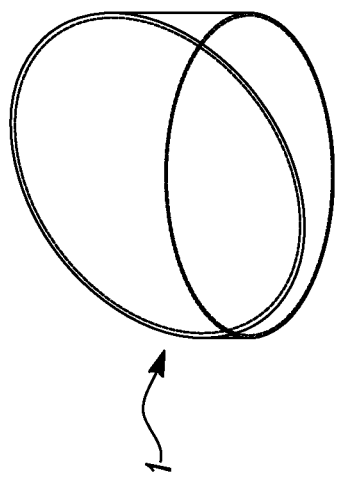
FIGS. 11A through 11D show different views of the cap of the preferred embodiment of the present invention.
Figure 11D:
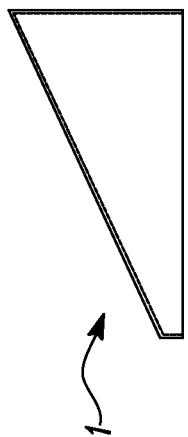
Figure 11A:
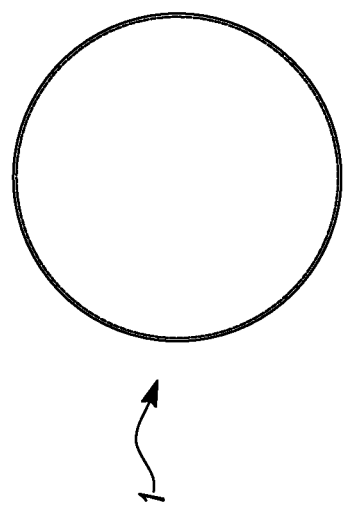
Figure 11C:
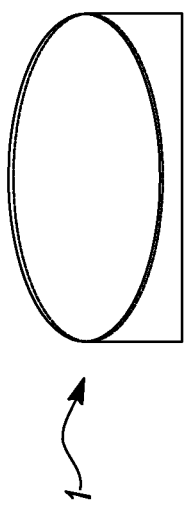
Figure 12B:
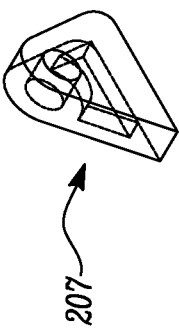
FIGS. 12A through 12D show different views of the escape cog of the preferred embodiment of the present invention.
Figure 12D:
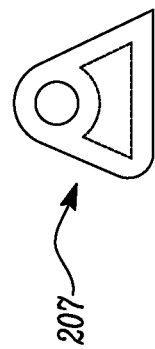
Figure 12A:
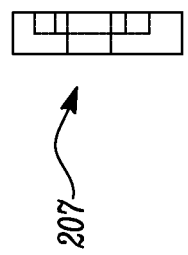
Figure 12C:
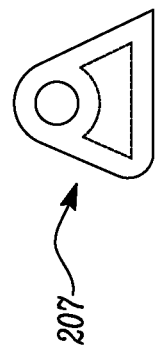
Figure 13B:
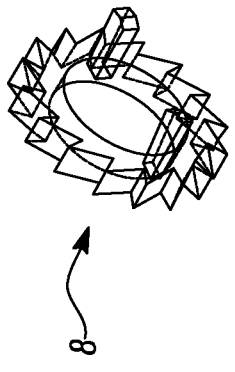
FIGS. 13A through 13D show different views of the escape wheel of the preferred embodiment of the present invention.
Figure 13D:
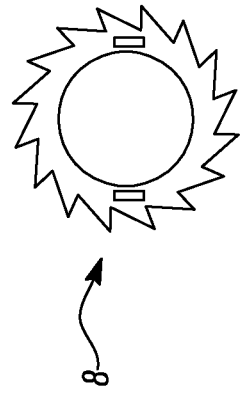
Figure 13A:
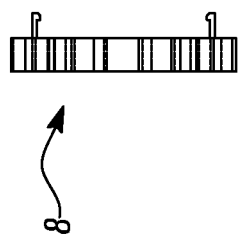
Figure 13C:
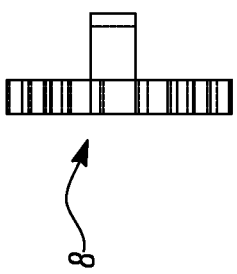
Figure 15B:
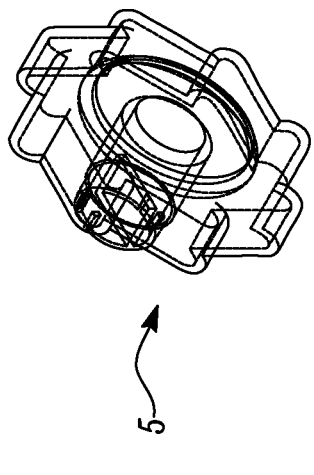
FIGS. 15A through 15D show different views of the handle of the preferred embodiment of the present invention.
Figure 15D:
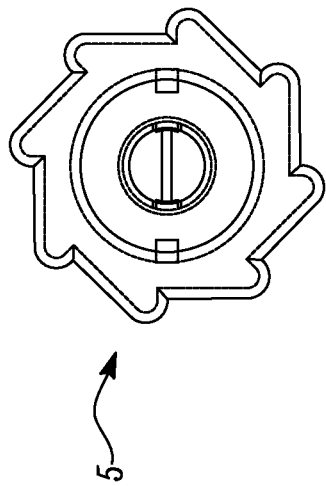
Figure 15A:
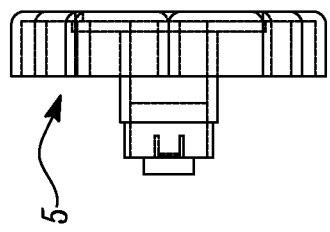
Figure 15C:
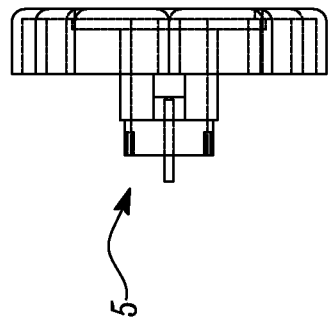
Figure 16A:
FIGS. 16A through 16D show different views of one-half of the hopper of the preferred embodiment of the present invention.
Figure 16B:
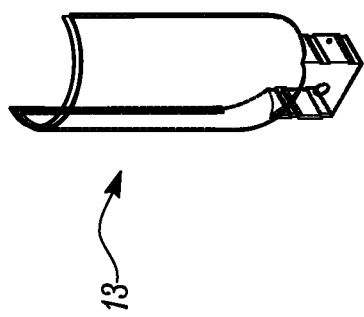
Figure 16C:
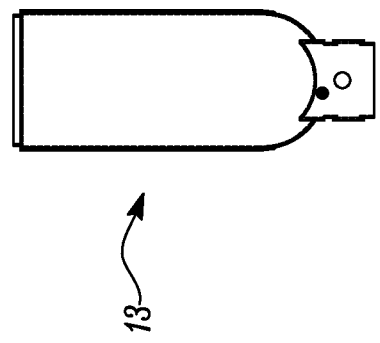
Figure 16D:
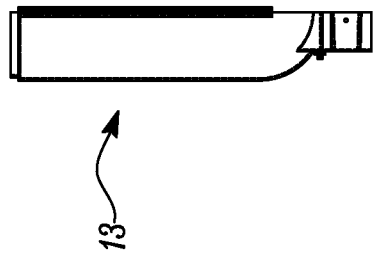
Figure 17B:
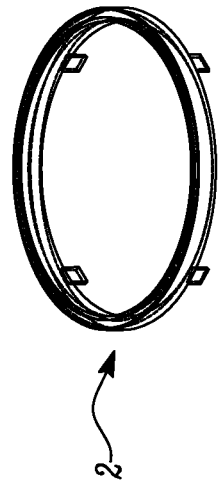
FIGS. 17A through 17D show different views of the retaining ring of the preferred embodiment of the present invention.
Figure 17D:
Figure 17A:
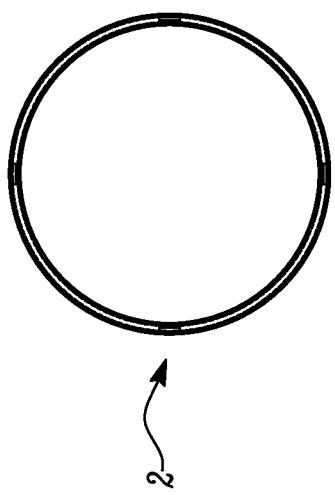
Figure 17C:

FIG. 6A-6D show the front sweep 12 of the preferred embodiment of the present invention. As seen in FIG. 6D, in the preferred embodiment, the front sweep 12 has a length A of 4.3-4.5", a width B of 2.5-2.7". As further seen in FIG. 6C, in the preferred embodiment, the front sweep 12 has a depth C of 2-2.2", and a height of 2.5-2.7". As seen in FIG. 6B, the front sweep is flat on one side and curved on the other side. The curved side allows the paddle wheel 20 to rotate in close proximity to the curved surface without hindering its rotation. The close proximity prevents the solid material directed into the dispensing chamber from flowing through uncontrollably. Any material that falls into the curved face of the front sweep 12 is swept by the incoming sweeping protrusion of the paddle wheel 20 to be dispensed in the next rotation of the paddle wheel 20.

FIG. 7A-D show the baffle 18 of the preferred embodiment of the present invention. As seen in FIG. 7A, in the preferred embodiment, the baffle 18 has a width A of 5.2-5.5", and a length B of 7.6-7.9". As seen in FIG. 7C, in the preferred embodiment, the baffle 18 has a height C of 2.3-2.6". As seen in FIG. 7D, the top face of the baffle 18 has two angled sections to direct the solid material into the dispensing chamber.

FIG. 8A-D shows the base 9 of the preferred embodiment of the present invention. The base 9 supports the dry food dispenser 100 and any solid food stored in the hopper. In addition, the base 9 dispenses the dry food through an opening. In the preferred embodiment, the base 9 has a depth A of 10-11", a height B of 6-7", and a dispensing opening with a radius C of 8-9".

FIG. 9A-D shows the crumb tray 31 of the preferred embodiment of the present invention. In the preferred embodiment, a crumb tray 31 is placed underneath the opening at the bottom of the base 9 to collect any food particles that may inadvertently fall down. The crumb tray 31 thereby enables quick cleaning of the area directly below the opening in the base 9.

FIG. 10A-D shows the bottom clip 29 of the preferred embodiment of the present invention. The bottom clip 29 assists in retaining the hopper halves 3-4 together and retains it in relatively fixed position within the base 9.

FIG. 11A-D shows the cap 1 of the preferred embodiment of the present invention. The cap 1 is capable of mechanically engaging and disengaging with the retaining ring 2 to allow the dry food dispenser to be refilled, and prevent contamination of the stored food when it is full and on use.

FIG. 12A-D shows the escape cog 7 of the preferred embodiment of the present invention.

FIG. 13A-D shows the escape wheel 8 of the preferred embodiment of the present invention. The escape cog 7, together with the escape wheel 8, prevents the handle 5 from rotating in counter clockwise direction while allowing the handle 5 to rotate in the clockwise direction. Although in the preferred embodiment, the escape wheel 8 and the escape cog 7 prevents the handle 5 from rotating in the counter-clockwise direction, it should be understood that in other implementations, the escape cog 7 and the escape wheel 8 may be modified to prevent the clockwise rotation of the handle 5.

FIG. 14A-D shows the handle cap 6 of the preferred embodiment of the present invention. When placed over the handle 5, the handle cap 6 hides any screw type connection and provides a platform to place branding for marketing purposes or other identifiers for the stored material.

FIG. 15A-D shows the handle 5 of the preferred embodiment of the present invention. The handle 5 provides an interface for a user to engage the paddle wheel 20 to operate the dry food dispenser 100 and dispense an appropriate amount of food to the user.

FIG. 16A-D shows one of the hopper halves 13 of the preferred embodiment of the present invention. As discussed above, the hopper halves 13-14 are mechanically engaged and held together by the bottom clips 29 and the retaining ring 2. When connected together, the hopper stores the dry food as well as retain the various parts of the dry food dispenser 100 together.

FIG. 17A-D shows the retaining ring 2 of the preferred embodiment of the present invention. As explained in relation to the FIG. 16 above, the retaining ring 2 assists in holding the two hopper halves 3-4 together, and provides a mechanical platform for the cap 1 to engage with the hopper.

FIG. 18A-D shows the back plate 17 of the paddle housing assembly of the preferred embodiment of the present invention.

Figure 19B:
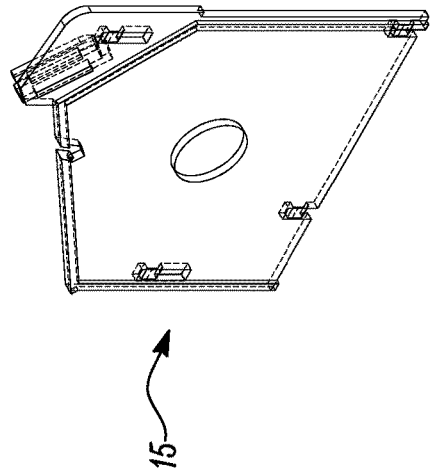
FIGS. 19A through 19D show different views of the side plate of the paddle housing assembly of the preferred embodiment of the present invention.
Figure 19D:
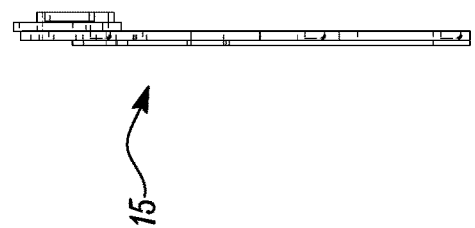
Figure 19A:
Figure 19C:
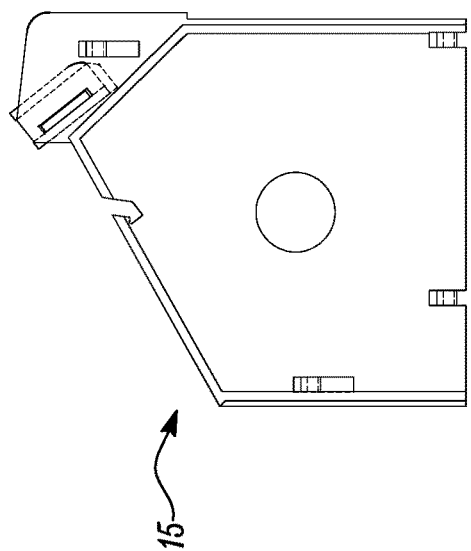

FIG. 19A-D show the first side plate 15 of the paddle housing assembly of the preferred embodiment of the present invention. The second side plate 16 in the preferred embodiment is a mirrored version of the first side plate 15. In alternative embodiments, the first and second side plates 15, 16 may be of different proportions or designs. As seen in FIGS. 19B-C, the first side plate 15 includes a roughly central hole 27 to allow the paddle wheel 20 to pass through and engage the handle 5 and keep the paddle wheel 20 located in an appropriate location.

Figure 20:
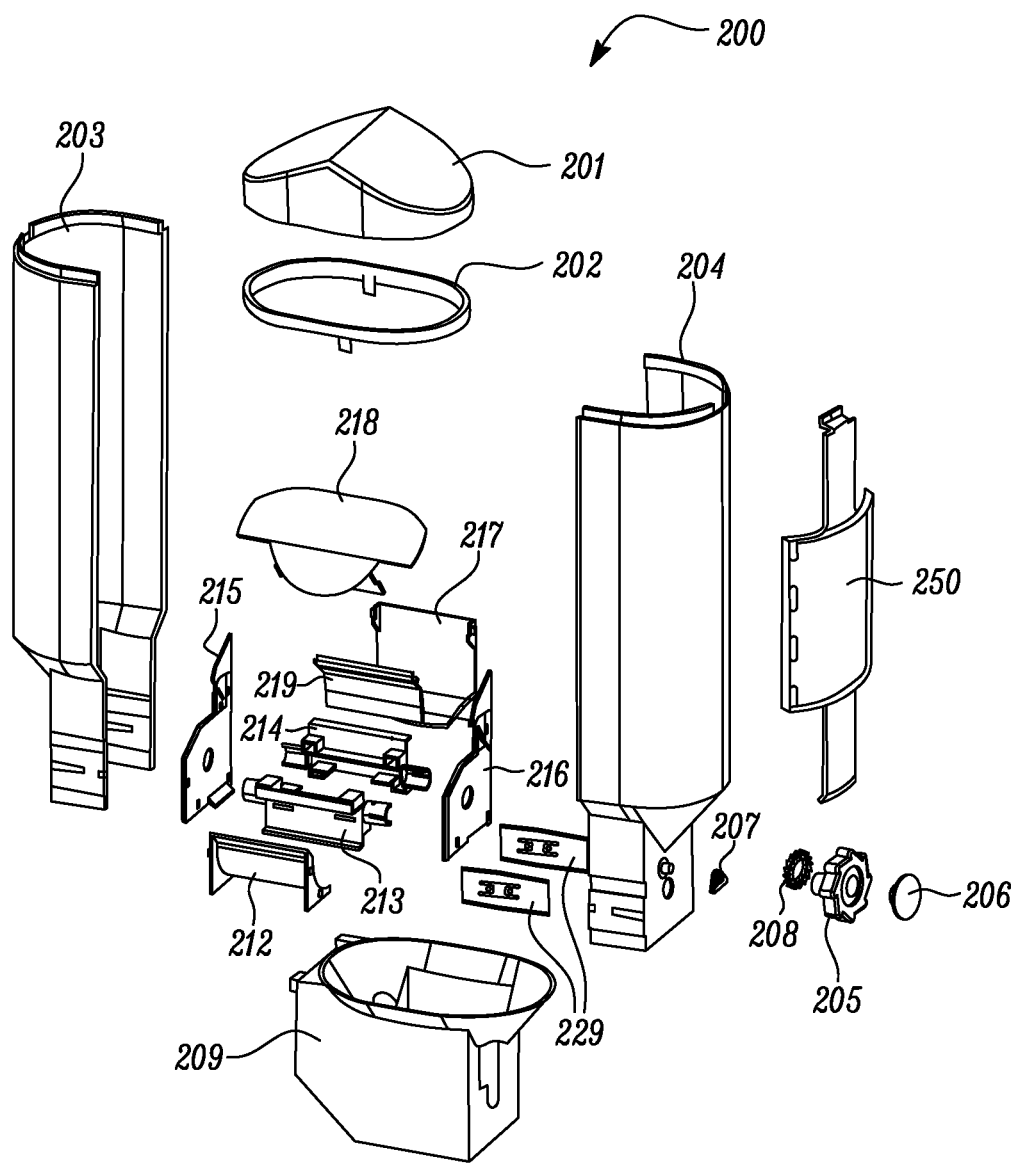
FIG. 20 shows an exploded view of an alternative embodiment of the present invention.

FIG. 20 shows an exploded view of an alternative embodiment of the dry food dispenser 200. The alternative embodiment of the bulk dry food dispenser is similar to the preferred embodiment. The alternative embodiment illustrates dimensional changes applied to the bulk dry food dispenser and the subsequent changes to interconnecting pieces. The alternative embodiment includes a cap 201, a retainer ring 202, two hopper halves 203 and 204, which may be joined to form an upper storage portion to hold dry cereal, two bottom clips 229, a lower dispensing chamber 230 to dispense cereal from the storage portion, a handle 205, a handle cap 206, an escape cog 207, an escape wheel 208, a base 209, and a graphic holder 250. The dispensing chamber assembly 230, which was discussed further in relation to FIG. 3 includes a front sweep 212, a paddle wheel 220 comprised of two paddle halves 213 and 214 which may be joined to form the paddle wheel 220, two side paddle housing plates 215 and 216, a back housing plate 217, and a baffle 218.

In operation, the two halves 203 and 204 of the dispenser are mechanically connected to one another and secured by the retainer ring 202 to form an upper storage portion or hopper to retain solid material. The alternative dispenser is shaped as two half circles connected by straight walls on either side. In other alternative embodiments, the embodiment of the two halves of the dispenser may form an elliptical shape. In further alternative embodiments, the two halves are not identical and one half may be larger than the other. In further alternative embodiments, the hopper portion of the alternative embodiment of the dry food dispenser may be comprised of more than two pieces physically connected through various connectors known in the art such as clips. In another alternative, the hopper may be form as a single piece.

A baffle 218 is located in the lower part of the dispensing chamber assembly 230 portion of the halves 203-204 and directs the solid material housed in the hopper by gravity towards the paddle wheel 220 in the dispensing chamber assembly 230. The paddle wheel 220 is enclosed within two side paddle housing plates 215-216, the front sweep 212, and the back housing plate 217. The front sweep 212 and the back plate 217 are located at the lower portion of the housing assembly to direct the flow of the material swept with the paddle wheel 220 to the opening in the base 209.

The handle 205 is operatively connected to the escape wheel 208 through a plurality of gears having intersecting teeth located in the outer diameter of the escape wheel 208. The escape wheel 208 is further operatively connected to the paddle wheel 220, shown as two paddle wheel halves 213 214. When a user rotates the handle 205, the engagement of the escape wheel 208 with the paddle wheel 220 causes the paddle wheel 220 to rotate proportional to the rotation of the handle 205. When the hopper halves are connected together to form the hopper and it is filled with solid material, the solid material is directed to the paddle wheel 220, which carries the solid material through and dispenses it through the opening into the base 209, which is further dispensed out of an opening in the base 209.

The paddle wheel 220 in the alternative embodiment is identical to the paddle wheel 20 as seen and described in relation to FIG. 5B. The paddle wheel 220 in the alternative embodiment can be manufactured identical to the paddle wheel 20. This is because the bottom housing in the preferred embodiment and the alternative embodiment has an identical sized square profile.

The alternative embodiment of the dry food dispenser 200 eliminates the flow assists 10 and 11 in the embodiment of the dry food dispenser 100 as shown and described in relation to FIGS. 1-19.

Figure 21:
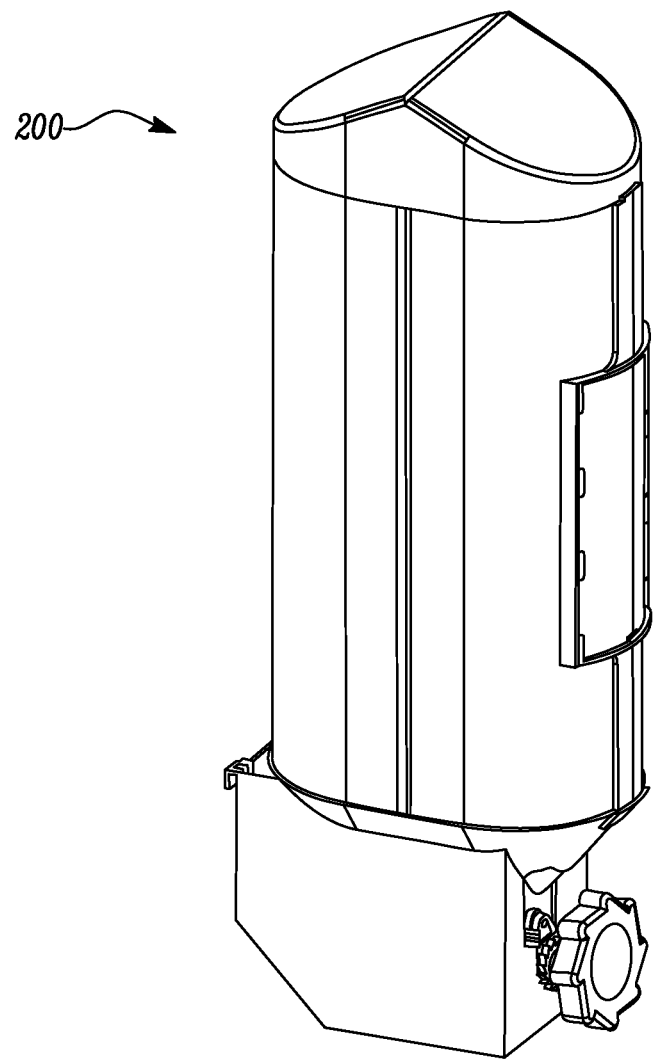
FIG. 21 shows the alternative embodiment of the present invention in its assembled form.

FIG. 21 shows the alternative embodiment of the dry food dispenser 200 in its assembled form. Although in the embodiments disclosed here the dry food dispenser includes a hopper as a container for the dry food, a person of ordinary skill in the art will appreciate that alternative methods for housing the dry food may be implemented without deviating from the invention. These alternative methods may include a direct feed from a larger container to the dispensing chamber assembly 230.

The specific parts of the alternative embodiment of the bulk dispenser 200 will be explained in further detail below. Although certain preferred dimensional ranges are provided here, it should be understood that the dimensions may be modified to some extent without deviating from the spirit of the invention. However, it has been discovered that the preferred dimensional ranges for elements in the dispensing chamber are synergistic and optimal. Furthermore, certain parts in the alternative embodiment of the bulk dispenser 200 are identical to the preferred embodiment and therefore will not be described here again.

Figure 22B:
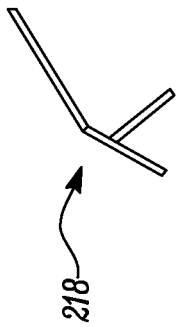
FIGS. 22A through 22D show different views of the baffle of the alternative embodiment of the present invention.
Figure 22A:
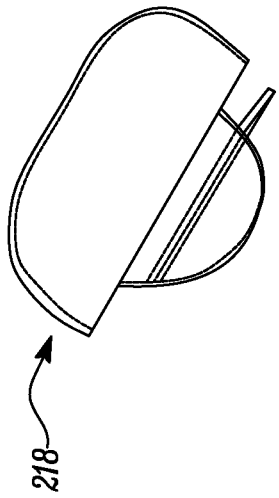
Figure 22D:
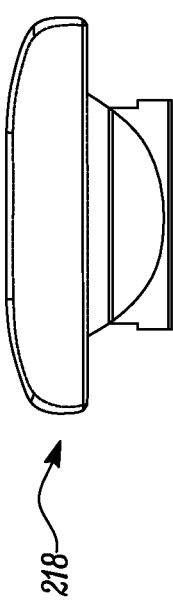
Figure 22C:
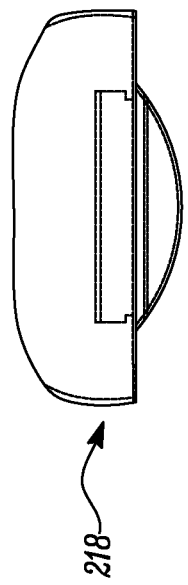
Figure 23B:
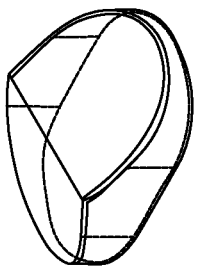
FIGS. 23A through 23D show different views of the cap of the alternative embodiment of the present invention.
Figure 23D:
Figure 23A:
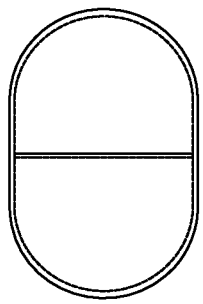
Figure 23C:
Figure 25B:
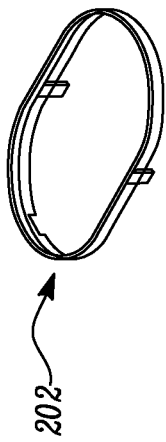
FIGS. 25A through 25D show different views of the retaining ring of the alternative embodiment of the present invention.
Figure 25D:
Figure 25A:
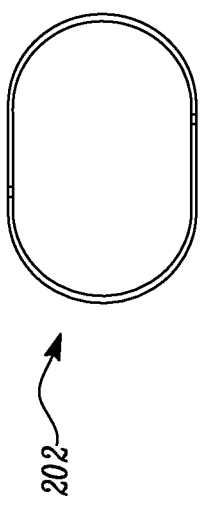
Figure 25C:

FIG. 22A-D show the baffle 218 of the alternative embodiment of the present invention. As seen in FIG. 22A, in the alternative embodiment, the baffle 218 has a width A of 4.2-4.5", and a length B of 7.6-7.9". As seen in FIG. 7D, in the preferred embodiment, the baffle 218 has a height C of 1.5-1.8". As seen in FIG. 7D, the top face of the baffle 218 has two angled sections to direct the solid material into the dispensing chamber. The angled sections of the baffle 218 can be identical in length, but in the preferred version of the alternative embodiment, the section of the baffle 218 which rests closer to the center of the housing when assembled is longer than the opposing section.

FIG. 23A-D shows the cap 201 of the alternative embodiment of the present invention. The cap 201 is capable of mechanically engaging and disengaging with the retaining ring 202 to allow the dry food dispenser to be refilled, and prevent contamination of the stored food when it is full and on use. In an alternative embodiment, the cap 201 may include an opening with a lid. The lid may include a releasable locking mechanism to retain the lid. Such alternative would allow the container to be refilled by unlocking the lid without removing the cap 201 from the hopper while preventing the contamination of the stored dry food.

FIG. 24A-D shows one of the hopper halves 213 of the alternative embodiment of the present invention. As discussed above, the hopper halves 213-214 are mechanically engaged and held together by the bottom clips 229 and the retaining ring 202. When connected together, the hopper stores the dry food as well as retains the various parts of the dry food dispenser 100 together. Each of the hopper halves 213-214 are formed as a semi-circle with a short side wall. This alternative shaped for the hopper halves 213-214 form an oblong circle. This alternative shape is preferred when multiple embodiments of the bulk dry food dispenser are to be placed side by side. The flat sides allow multiple bulk dry food dispensers to stack up, and prevents each from rotating in place when a user turns the handle to dispense dry food.

FIG. 25A-D shows the retaining ring 202 of the alternative embodiment of the present invention. As explained in relation to the FIG. 24 above, the retaining ring 202 assists in holding the two hopper halves 203-204 together, and provides a mechanical platform for the cap 201 to engage with the hopper.

FIG. 26A-D show the first side plate 215 of the paddle housing assembly of the alternative embodiment of the present invention. The second side plate 216 in the alternative embodiment is a mirrored version of the first side plate 215. In alternative embodiments, the first and second side plates 215, 216 may be of different proportions or designs. As seen in FIGS. 26B-C, the first side plate 215 includes a roughly central hole 227 to allow the paddle wheel 220 to pass through and engage the handle 205 and keep the paddle wheel 220 located in an appropriate location.

FIG. 27A-D show the graphic holder 250 of the alternative embodiment of the present invention. The graphic holder 250 is placed in the front facing portion of the bulk dry food dispenser above the handle and the opening. Paper, metal, or any other kind of thin material may be placed in the graphic holder 250. The graphic holder 250 provides a platform to place branding for marketing purposes or other identifiers for the stored material.

This invention accomplishes significant objectives, in particular it allows:
Product housing volume of 3.5 gallons or 808 cubic inches and may exceed 830 cubic inches.
Dispense an average cereal bowl of product in 2-3 knob turns.
Does not crush, break or damage any cereal product.
Uses Gravity feed.
Achieves, first in/first out product flow.
Enables controlled dispensing of product and no free flow from dispenser.
Easily disassembles for cleaning and machine washable.
Offers high product visibility.

We claim:
1. A bulk food dispenser including:
a source for containing a solid bulk material to be dispensed;
a paddle housing including a plurality of openings in communication with the source;
a baffle located above the paddle housing for directing the solid bulk material from the source to the paddle housing; and
a paddle wheel retained within the paddle housing, the paddle wheel comprising two identical shaped paddle halves joined to one another, each paddle half containing two sweeping protrusions and two blocking protrusions for directing the solid bulk material out of the paddle housing, wherein at least one of the plurality of the openings receives the solid bulk material directed by the baffle, and wherein at least one of the plurality of the openings dispenses the solid bulk material out of the paddle housing; and, wherein the baffle includes at least two angled portions on a top section of the baffle, wherein the angle between the at least two angled portions is more than 90 degrees and less than 180 degrees.

2. The bulk food dispenser of claim 1, wherein the source is a storage container located above the paddle housing for containing the solid bulk material, forming a hopper.

3. The bulk food dispenser of claim 2, wherein the storage container is circular.

4. The bulk food dispenser of claim 2, wherein the storage container is shaped as two half circular walls on opposite ends and two straight walls connecting the two half circular walls on the remaining two sides.

5. The bulk food dispenser of claim 3, wherein the paddle housing comprises a back plate, two side plates, and a front sweep, wherein each of the two side plates including two ends, and wherein one end of each of the side plates is removably attached to the two ends of the front sweep and the other end of each of the side plates is removably attached to the back plate.

6. The bulk food dispenser of claim 5, wherein the two side plates further comprises a roughly central through hole, wherein the central through hole removably attaches to the paddle wheel.

* * * * *